United States Patent
Liu et al.

(10) Patent No.: US 12,524,625 B1
(45) Date of Patent: Jan. 13, 2026

(54) PROMPT REFINEMENT SERVICE FOR ENHANCING GENERATIVE MODEL OUTPUT

(71) Applicant: Amazon Technologies, Inc., Seattle, WA (US)

(72) Inventors: Yi Liu, Seattle, WA (US); Bingqing Ge, Seattle, WA (US); Rohit Malshe, Kirkland, WA (US); Dilip Kumar Sivasankar, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 209 days.

(21) Appl. No.: 18/235,034

(22) Filed: Aug. 17, 2023

(51) Int. Cl.
*G06F 40/40* (2020.01)
*G06N 20/00* (2019.01)

(52) U.S. Cl.
CPC ............ *G06F 40/40* (2020.01); *G06N 20/00* (2019.01)

(58) Field of Classification Search
CPC ..................................................... G06F 40/40
USPC ............................................................. 704/9
See application file for complete search history.

(56) References Cited

U.S. PATENT DOCUMENTS

| 12,254,864 B1* | 3/2025 | Lajszczak | ............. G10L 13/047 |
| 2023/0316001 A1* | 10/2023 | Araki | ...................... G06F 40/35 |
| 2024/0330718 A1* | 10/2024 | Tan | ........................... G06N 3/08 |
| 2024/0362758 A1* | 10/2024 | Bagnall | ................... G06V 20/70 |
| 2025/0005050 A1* | 1/2025 | Krishnan | ............... G06F 16/243 |
| 2025/0045256 A1* | 2/2025 | Gottlob | ................. G06F 16/211 |

OTHER PUBLICATIONS

Full Automation of Goal-driven LLM Dialog Threads with And-Or Recursors and Refiner Oracles, Publication Date: Jun. 24, 2023 How we process NPL dates Authors Tarau, Paul (Year: 2023).*
Joint Prompt Optimization of Stacked LLMs using Variational Inference, Authors: Sordoni, Alessandro • Yuan, Xingdi • Côté, Marc-Alexandre • Pereira, Matheus • Trischler, Adam • Xiao, Ziang • Hosseini, Arian • Niedtner, Friederike • Roux, Nicolas Le Arxiv ID: 2306.12509 Publication Date: Jun. 21, 2023 (Year: 2023).*
Full Automation of Goal-driven LLM Dialog Threads with And-Or Recursors and Refiner Oracles, Publication Date: Jun. 24, 2023 How we process NPL dates , Authors: Tarau, Paul (Year: 2023) (Year: 2023).*

(Continued)

*Primary Examiner* — Bharatkumar S Shah
(74) *Attorney, Agent, or Firm* — Kilpatrick Townsend & Stockton LLP

(57) ABSTRACT

A prompt refinement service can be used to enhance output from a generative model. Entity input that indicates a request for a response can be received. A set of prompt refiners can be received. A prompt refinement service can identify a particular prompt refiner among the set of prompt refiners having a highest similarity to the entity input compared with other prompt refiners. The prompt refinement service can aggregate the particular prompt refiner with the entity input to generate an aggregated input. The prompt refinement service can transmit the aggregated input to the generative model to cause the generative model to return an output in response to the entity input.

20 Claims, 6 Drawing Sheets

(56) References Cited

OTHER PUBLICATIONS

Joint Prompt Optimization of Stacked LLMs using Variational Inference, Authors: Sordoni, Alessandro * Yuan, Xingdi * Cété, Marc-Alexandre « Pereira, Matheus « Trischler, Adam « Xiao, Ziang * Hosseini, Arian « Niedtner, Friederike * Roux, Nicolas Le Arxiv ID: 2306.12509 Publication Date: Jun. 21, 2023 (Ye (Year: 2023).*
Vaswani, et al., Attention Is All You Need. webpage found at https://arxiv.org/abs/1706.03762. Aug. 2023.
Thoppilan, et al., LaMDA: Language Models for Dialog Applications. webpage found at https://arxiv.org/pdf/2201.08239.pdf Feb. 2022.
Brown, et al., Language Models are Few-Shot Learners. webpage found at https://arxiv.org/abs/2005.14165 Jul. 2020.
Shin, et al., AUTOPROMPT: Eliciting Knowledge from Language Models with Automatically Generated Prompts. webpage found at https://arxiv.org/pdf/2010.15980.pdf Nov. 2020.
Jiang, et al., How Can We Know What Language Models Know? webpage found at https://arxiv.org/abs/1911.12543 May 2020.
Lester, et al., The Power of Scale for Parameter-Efficient Prompt Tuning. webpage found at https://arxiv.org/abs/2104.08691 Sep. 2021.
Hill, et al., An Efficient Bandit Algorithm for Realtime Multivariate Optimization. webpage found at https://arxiv.org/pdf/1810.09558.pdf Oct. 2018.

\* cited by examiner

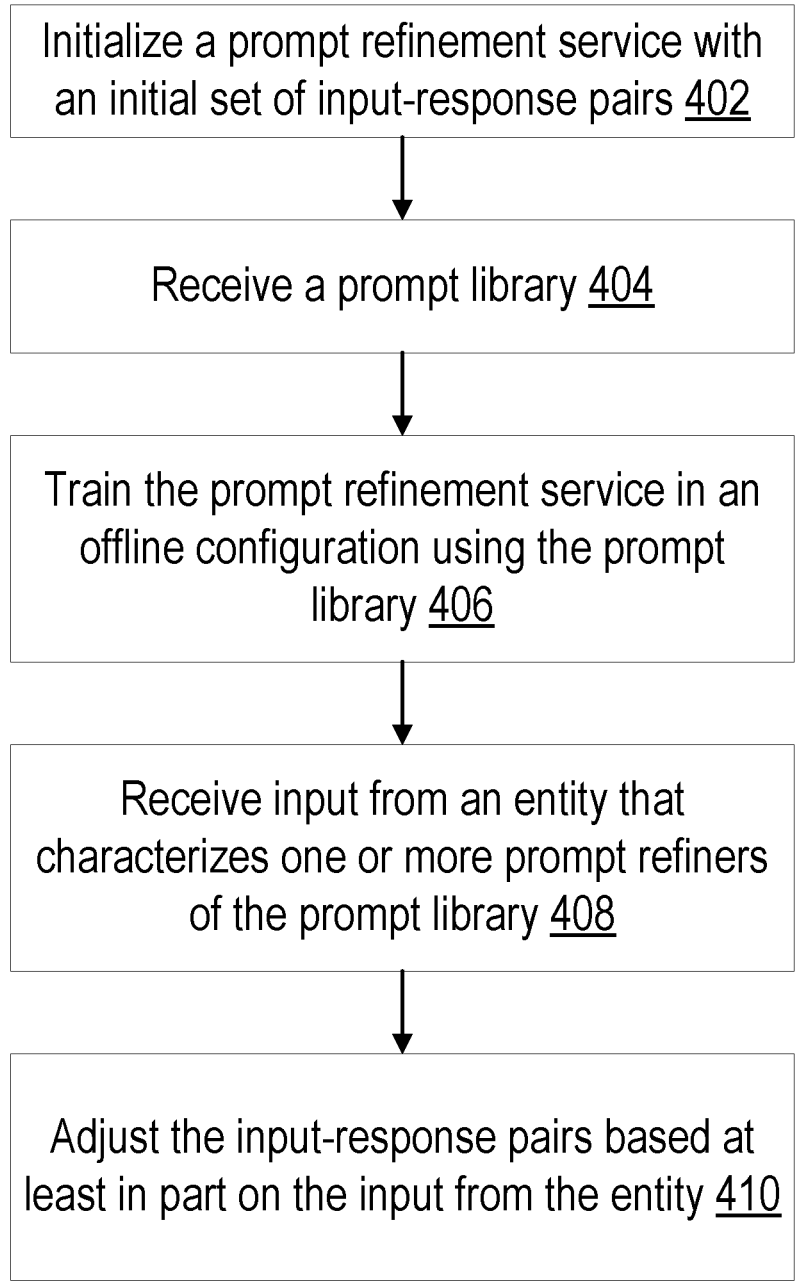

```
┌─────────────────────────────────────┐
│ Initialize a prompt refinement      │
│ service with an initial set of      │
│ input-response pairs 402            │
└─────────────────────────────────────┘
                 │
                 ▼
┌─────────────────────────────────────┐
│ Receive a prompt library 404        │
└─────────────────────────────────────┘
                 │
                 ▼
┌─────────────────────────────────────┐
│ Train the prompt refinement service │
│ in an offline configuration using   │
│ the prompt library 406              │
└─────────────────────────────────────┘
                 │
                 ▼
┌─────────────────────────────────────┐
│ Receive input from an entity that   │
│ characterizes one or more prompt    │
│ refiners of the prompt library 408  │
└─────────────────────────────────────┘
                 │
                 ▼
┌─────────────────────────────────────┐
│ Adjust the input-response pairs     │
│ based at least in part on the input │
│ from the entity 410                 │
└─────────────────────────────────────┘
```

FIG. 4

PROMPT REFINEMENT SERVICE FOR ENHANCING GENERATIVE MODEL OUTPUT

BACKGROUND

Various computer models, such as large language models and vision-language models, may use input, such as input provided by an entity, to generate an output. In a particular example, an entity may input a string of text into a large language model, and the large language model may output a string of text in response to the input. The various computer models may be trained to generate the output in response to receiving input from the entity. But, the various computer models may not receive similar inputs or all required inputs from the entity for generating the output. Thus, training the various computer models on each potential input from the entity may become onerous, may involve excessive computing resources, and/or may otherwise be ineffective.

BRIEF DESCRIPTION OF THE DRAWINGS

Various embodiments in accordance with the present disclosure will be described with reference to the drawings, in which:

FIG. 4 illustrates a flowchart of a process for training a prompt refinement service in accordance with at least one embodiment;

DETAILED DESCRIPTION

Figure 1:
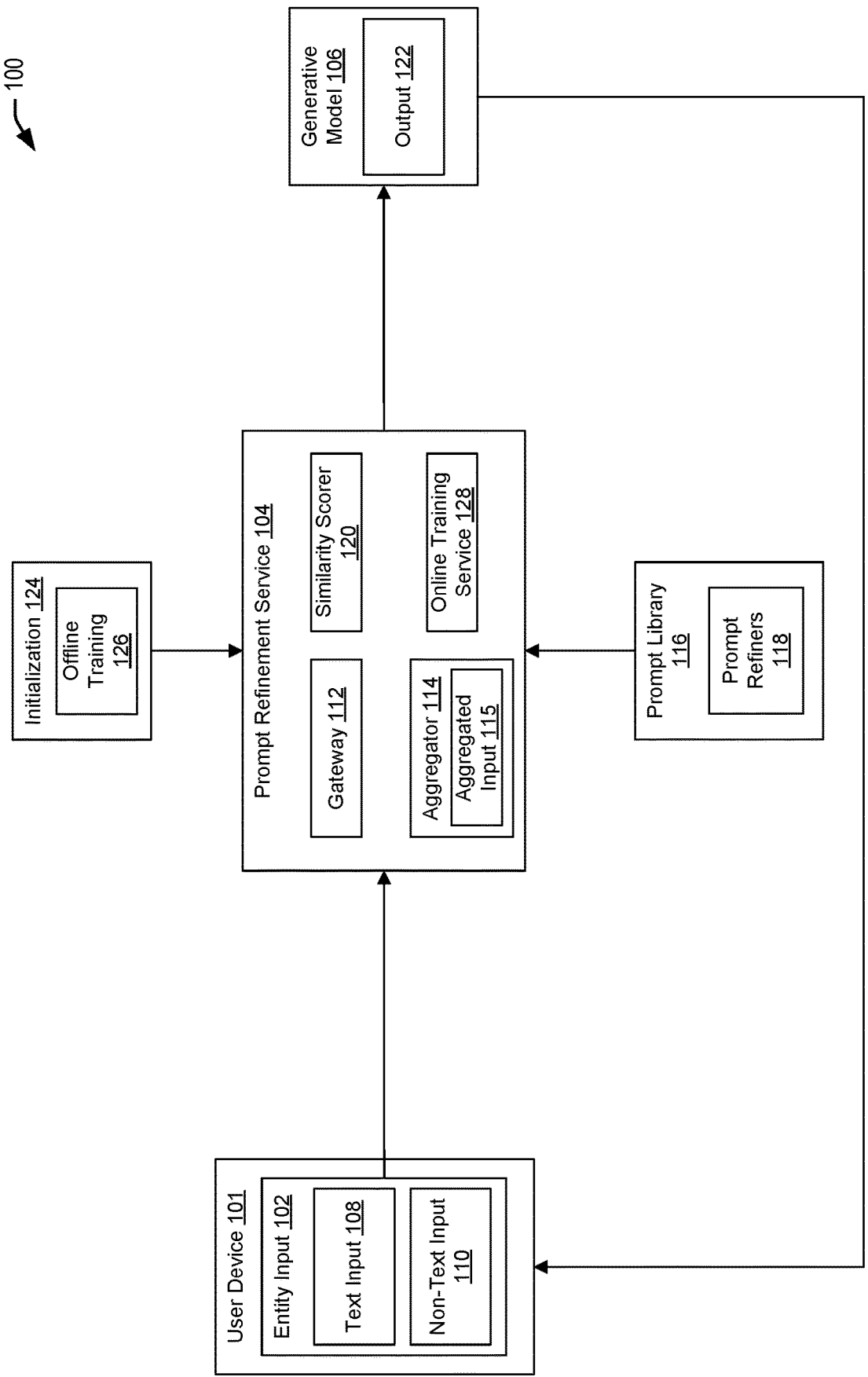
FIG. 1 illustrates a block diagram of a computing environment in which a prompt refinement service can be used to refine entity input in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

As described herein, "input" may refer to a singular input or an unbounded number of inputs. Additionally, or alternatively, "output" may refer to singular output or an unbounded number of outputs.

Certain aspects and features of the present disclosure relate to a prompt refinement service that can be used to refine prompts for input into one or more computer-based models. The one or more computer-based models may include a large language model, a generative model, or any other suitable model that can generate output based on input from an entity. The prompts may include a string of text, an image, a video, or any other suitable input that can be used as a prompt input for the one or more computer-based models. The prompt refinement service may be or include one or more computer-based services that can refine or otherwise adjust input received from an entity to generate the prompt input for the one or more computer-based models. In some examples, the prompt refinement service may be or include a machine-learning model, an artificial intelligence model, or other suitable computer-based model that can be trained to refine the input from the entity to generate the prompt input for the one or more computer-based models.

In a particular example, a user of a computing device may access a large language model and may input a coarse prompt to cause the large language model to generate an output. Examples of the coarse prompt may include "where is my package?" "what is the weather going to be like for my upcoming vacation?" "show me my latest order," or other suitable examples. The large language model may be integrated with, or otherwise communicatively coupled with, a prompt refinement service that may refine or otherwise adjust the coarse prompt provided by the user. For example, the coarse prompt may be input into, or otherwise provided to, the prompt refinement service prior to or substantially contemporaneous with respect to inputting the coarse prompt into the large language model. The prompt refinement service may access a prompt refiner library, which may include one or more examples of prompt refiners. The prompt refiners may be configured to enhance the coarse prompt to enhance an output of the large language model, for example without additional or otherwise excessive training of the large language model. The prompt refiner library may be generated, maintained, and the like by an entity or organization that provides the large language model, or may otherwise be provided by a third-party entity or organization. Some examples of prompt refiners can include "the organization's return policy is 30 days from the date of the interaction," "rewards earned by engaging in interactions include 2% additional resources," and "romantic style," though other suitable prompt refiners are within the scope of the present disclosure. The prompt refinement service may be trained to augment the coarse prompt with one or more prompt refiners from the prompt refiner library to enhance the coarse prompt by generating an aggregated prompt. The prompt refinement service may transmit the aggregated prompt to the large language model to cause the large language model to generate and output a response to the user's original coarse prompt.

Techniques described herein include refining a prompt transmitted by an entity to a generative model. A computing system may initialize a prompt refinement service, for example prior to or substantially contemporaneous with respect to receiving the input from the entity. The computing system may initialize the prompt refinement service by assigning (e.g., randomly) values to a set of input-response pairs. The computing system may receive a set of prompt refiners, for example by accessing or otherwise receive a prompt refiner library or other suitable embodiment of prompt refiners. In some embodiments, each prompt refiner of the set of prompt refiners may be configured to enhance a performance of the generative model when aggregated with input from the entity. The computing system may train the prompt refinement service in an offline configuration. For example, the computing system, via the prompt refinement service, can determine, for each potential entity input of a set of potential entity inputs, a corresponding prompt refiner of the set of prompt refiners. The computing system can adjust the set of input-response pairs based at least in part on the corresponding prompt refiner of the set of prompt refiners to associate the potential entity input and the corresponding prompt refiner with the set of input-response pairs.

The computing system can identify, by the prompt refinement service and among the set of prompt refiners, a particular prompt refiner that has a highest similarity to the input provided by the entity compared with other prompt refiners of the set of prompt refiners by using the adjusted plurality of input-response pairs. The computing system can aggregate, for example by using the prompt refinement service, the particular prompt refiner with the input from the entity to generate an aggregated input. The computing system can, for example by using the prompt refinement service, transmit the aggregated input to the generative model to cause the generative model to return an output in response to the input from the entity. The output may be provided to the entity as if the input from the entity was directly transmitted to the generative model such as without informing the entity of the aggregated input, etc.

The prompt refinement service, the generative model, or a combination thereof, can be used in various contexts, for various purposes, and the like. For example, the prompt refinement service, the generative model, or a combination thereof, can be stored in or otherwise can be executed from a cache. Additionally or alternatively, the prompt refinement service, the generative model, or a combination thereof, can be used with respect to the following.

Rating prompts: the prompt refinement service can access a prompt library that can include a set of prompt refiners that can be rated by third-party entities. For example, each prompt refiner may have one or more ratings by a user of a computing device, and the prompt refinement service can factor in the prompt refiner rating when determining similarity scores, identifying a particular prompt refiner, and the like.

Iterative prompt generation: prompts and/or prompt refiners can be iteratively passed into the prompt refinement service to generate an ensemble. In a particular example, a response from a generative model can be analyzed, for example by an artificial intelligence model, which may be or include the prompt refinement service, to generate multiple different prompt refiners. The multiple different prompt refiners may be input into the generative model to generate multiple corresponding responses, which can be used again, as above, to cause the artificial intelligence model to generate multiple new prompt refiners, etc. A prompt library can eventually be generated using the generated prompt refiners.

Prompt tree traversal: a generative model can be queried, or asked, to generate a hierarchical structure of prompts and/or prompt refiners to develop a prompt library based on a tree structure. In some examples, the prompt refinement service may be configured to traverse the tree to identify the particular prompt refiner to aggregate with entity input.

Prompt engineering: in some examples, constrained prompt engineering can be performed. The prompt refinement service and/or the generative model can receive input that includes blank regions having a classification. Examples of the classification may include entity type, challenge type, etc. In some examples, the blank regions may intentionally not have a classification. The prompt refinement service and/or the generative model can be queried or asked to fill in the blanks to generate prompt refiners.

Prompt scoring: Entities, such as users of computing devices, can manually rate a set of prompts and/or prompt refiners and responses. The ratings and the set of prompts and/or prompt refiners and responses can be input into the generative model and/or the prompt refinement service, and the generative model and/or the prompt refinement service can score newly input sets of prompts and/or prompt refiners and responses based at least in part on the learned scoring techniques. Additionally or alternatively, the generative model and/or the prompt refinement service can be queried or asked to generate new sets of prompts and/or prompt refiners and responses.

Augmented data tables: prompt refiners and responses can be stored, for example in a data repository, for training purposes. The data repository can be integrated with a scoring engine such as the prompt refinements service. In some examples, binary features can be generated based on the stored data. A machine-learning model can be generated or used to identify prompt refiners that are valuable based at least in part on the binary features.

Keyword-based prompt generation: some domain-specific language may be complicated and difficult to comprehend. Domain-specific words can be used to train the generative model and/or the prompt refinement service. For example, in the medical industry, words like "symptom" "diagnosis" and "treatment" can be used to train the generative model and/or the prompt refinement service for medical-related prompts.

Language translation: prompt refiners can be identified by the prompt refinement service and used to guide the generative model to provide enhanced outputs for language translations. For example, prompt refiners can be generated for specific language translation pairs (e.g., English-to-Spanish and vice versa, French-to-German and vice versa, etc.).

Dynamic prompt generation: prompts and/or prompt refiners can be generated on-the-fly or otherwise substantially contemporaneous with respect to a user providing input. A user interface can provide a chatbot-like interface for a user to provide input and for the prompt refinement service and/or the generative model to output the on-the-fly-generated prompts and/or prompt refiners.

Backwards generation: a collection of inputs, prompt refiners, and responses can be generated or compiled, for example, from historical data sources, from a generative model, etc. The collection can be randomly or pseudo-randomly transmitted to various users to request feedback on the inputs, prompt refiners, and responses. The user responses can be mapped, for example, using machine-learning, clustering, or the like, to existing prompt libraries to generate enhanced prompt refiners.

In some examples, the prompt refinement service, the generative model, or a combination thereof, can use, receive as input, and/or recommend a temperature parameter, a prompt, temperature tuple, and the like. A temperature parameter in a generative model can be used to control parameters (e.g., quality) of output of the generative model. Prompts can be input as a fixed prompt, temperature tuple, as an on-the-fly prompt, temperature tuple, etc. Using temperature and/or the tuple can enhance an output from the generative model. Additionally or alternatively, models, such as the generative model, the prompt refinement service, etc., can be cached in memory to be easily retrievable by a computing service. In a particular example, a tuple of the prompt refinement service and the generative model can be cached and can be retrieved on-the-fly by the computing service.

FIG. 1 illustrates a block diagram of a computing environment 100 in which a prompt refinement service 104 can be used to refine entity input 102 in accordance with at least one embodiment. As illustrated in FIG. 1, the computing environment 100 can include at least a user device 101, the prompt refinement service 104, and a generative model 106, though the computing environment 100 may include any other components or numbers of components. The entity input 102 may be transmitted to the prompt refinement service 104 via the user device 101 such as a mobile computing device, a personal computing device, such as a laptop computer, a desktop computer, etc., and the like. The entity input 102 may include text input 108 and non-text input 110. For example, the text input 108 may be or include a string of text, which may be or include natural language input, a query, and the like. Additionally or alternatively, the non-text input 110 may be audio input, such as verbal input spoken into the user device 101, may be video input, such as a link to a video file, video taken by the user device 101, or other sources of video data, and the like.

The prompt refinement service 104 may receive the entity input 102, for example, from the user device 101. In some examples, a gateway 112 of the prompt refinement service 104 may ingest or otherwise receive the entity input 102. For example, the gateway 112 may establish a connection, such as via an application programming interface (API), with the user device, or vice versa, and the entity input 102 may be input into the prompt refinement service 104 via the gateway 112. Additionally or alternatively, the prompt refinement service 104 may include an aggregator 114 that may be used to augment a prompt refiner with the entity input 102. For example, the prompt refinement service 104 may access a prompt library 116, which may include prompt refiners 118, to access the prompt refiners 118. The prompt library 116 may be generated by one or more users of a user device or the generative model 106, by an entity that provides the generative model 106, by a third-party entity, or by any other suitable entity, or any combination thereof. In some examples, the prompt library 116 may be stored in a data repository that may be communicatively coupled with the prompt refinement service 104, and the prompt library 116 may be continuously updated or refined, periodically updated or refined, or updated or refined on-demand. Updating or refining the prompt library may involve adjusting the prompt refiners 118, adding new instances of prompt refiners to the prompt refiners 118, removing instances of prompt refiners from the prompt refiners 118, or any suitable combination thereof.

The prompt refinements service 104 may identify a particular prompt refiner among the prompt refiners 118 that may enhance the entity input 102 more than any other prompt refiner of the prompt refiners 118. For example, the prompt refinement service 104 may use a similarity scorer 120 to determine similarity scores between each prompt refiner included in the prompt library 116 and a prompt refiner included in an input-response pair on which the prompt refinement service 104 may be trained. The particular prompt refiner of the prompt refiners 118 may have the highest similarity score compared to other prompt refiners of the prompt refiners 118. The prompt refinement service 104 may use the aggregator 114 to aggregate the entity input 102 and the particular prompt refiner to generate an aggregated input 115, and the prompt refinement service 104 can transmit the aggregated input 115 to the generative model 106 to cause the generative model 106 to generate an output 122.

The generative model 106 can receive the aggregated input 115 from the prompt refinement service 104, and the generative model 106 can generate the output 122 based at least in part on the aggregated input 115. For example, if the aggregated input 115 indicates that the entity that generated the entity input 102 is interested in considering acquiring a particular type of good or service based on a particular style, the output 122 generated by the generative model 106 may include a list of providers of the good or service that may additionally be associated with the particular style, etc. The generative model 106 may transmit the output 122 to the user device 101 for display on the user device 101.

The prompt refinement service 104 may be trained in multiple different modes. For example, the prompt refinement service 104 may be trained in an offline mode, in an online mode, and the like. Training the prompt refinement service 104 via the offline mode may involve training the prompt refinement service 104 prior to using the prompt refinement service 104. For example, the prompt refinement service 104 may be initialized, such as via initialization 124, by assigning values to a set of input-response pairs. The initialization 124 may cause an offline training 126 to be performed on the prompt refinement service 104. In some examples, the assigned values may be assigned randomly or pseudo-randomly. Additionally or alternatively, each input-response pair may include at least a potential entity input and a potential output that can be generated by a generative model such as the generative model 106. The prompt refinement service 104 may receive or access a set of prompt refiners for training the prompt refinement service 104 in the offline mode or configuration. In some examples, each prompt refiner of the set of prompt refiners may be configured to enhance a performance of the generative model 106 when aggregated with potential input from an entity. The offline training 126 may involve determining, for each potential entity input of a set of potential entity inputs corresponding to the set of input-response pairs, a corresponding prompt refiner of the set of prompt refiners. The corresponding prompt refiner may enhance the potential entity input more than any other prompt refiner of the set of prompt refiners. For example, the corresponding prompt refiner may cause the generative model 106 to generate an output that is closest to a requested output from the potential entity input. The offline training 126 may additionally involve adjusting the set of input-response pairs based at least in part on the corresponding prompt refiner of the set of prompt refiners to associate the potential entity input and the corresponding prompt refiner with the plurality of input-response pairs.

Additionally or alternatively, the prompt refinement service 104 can be trained in an online mode or configuration. For example, the prompt refinement service 104 can include or otherwise execute an online training service 128, which can cause the prompt refinement service 104 to be trained in the online configuration. In response to the generative model 106 generating and transmitting the output 122 to the user device 101, the user may indicate that the output 122 is satisfactory or is unsatisfactory. Examples in which the user may indicate that the output 122 is satisfactory may include (i) the user proceeding to conduct an interaction based on the output 122, (ii) the user not generating a similar and subsequent entity input for the generative model 106, (iii) the user directly providing feedback stating that the output 122 is satisfactory, and the like. In response to determining that the user indicated that the output 122 is satisfactory, the prompt refinement service 104 may take no further action, may increase a similarity score or other suitable weight for the corresponding prompt refiner used to generate the aggregated input that caused the generative model 106 to generate the output 122, etc. Examples in which the user may indicate that the output 122 is unsatisfactory may include (i) the user failing to conduct an interaction based on the output 122, (ii) the user generating a similar and subsequent entity input for the generative model 106, (iii) the user directly providing feedback stating that the output 122 is unsatisfactory, and the like. In response to determining that the user indicated that the output 122 is unsatisfactory, the prompt refinement service 104 may remove the corresponding prompt refiner from the prompt library 116 (or may no longer use the corresponding prompt refiner), may decrease a similarity score or other suitable weight for the corresponding prompt refiner used to generate the aggregated input that caused the generative model 106 to generate the output 122, etc.

Figure 2:
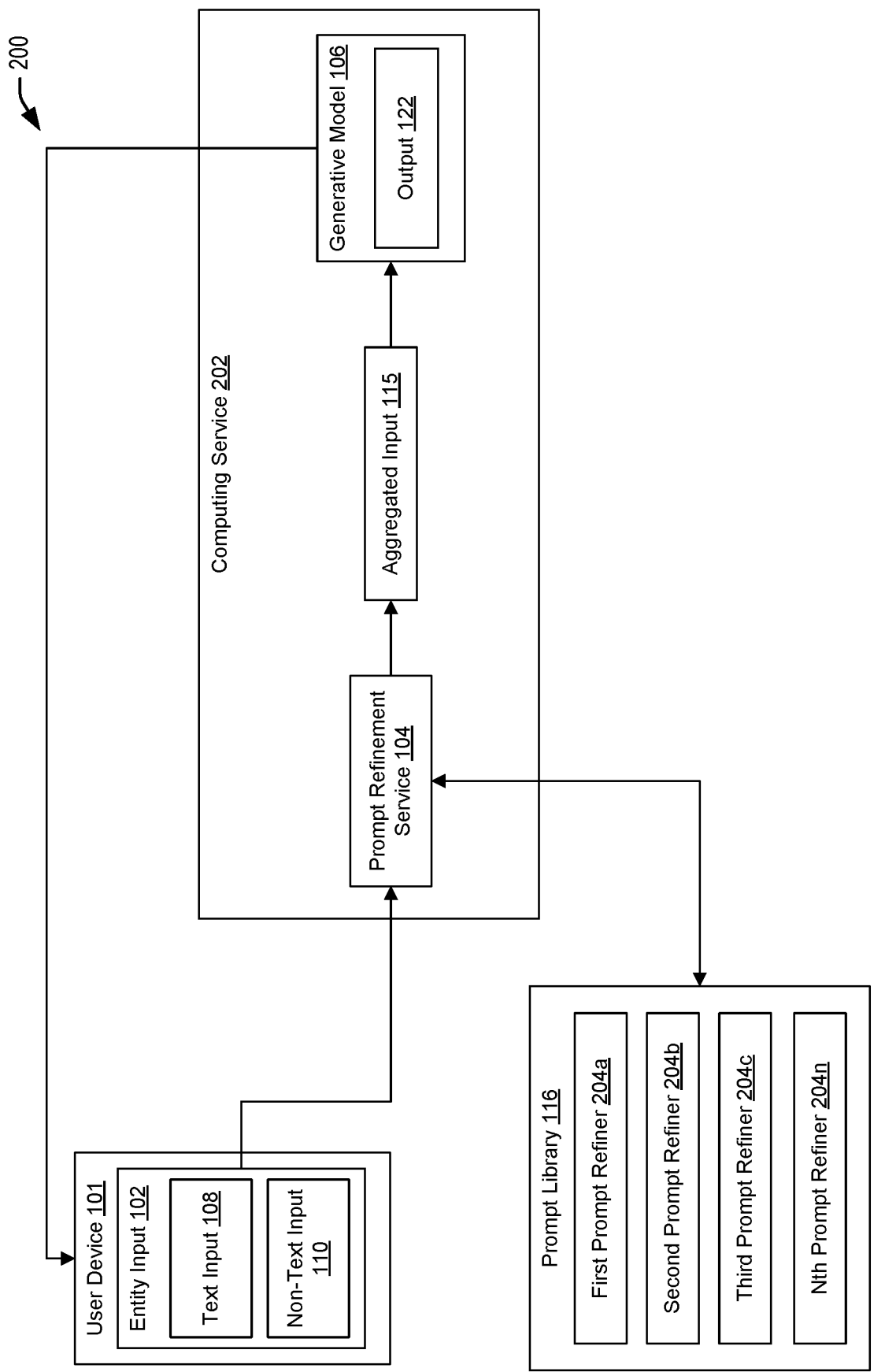
FIG. 2 illustrates a block diagram of data flow with respect to a prompt refinement service in accordance with at least one embodiment.

FIG. 2 illustrates a block diagram 200 of data flow with respect to a prompt refinement service 104 in accordance with at least one embodiment. As illustrated in FIG. 2, the block diagram 200 can include the user device 101, the prompt library 116, and a computing service 202, though the block diagram 200 may include any other components or numbers of components for illustrating the flow of data with respect to the prompt refinement service 104. The user device 101 may generate the entity input 102, for example based on input provided to the user device 101 from a user of the user device 101. The entity input 102 may include the text input 108, such as natural language input, one or more queries, and the like, and the entity input 102 may include the non-text input 110 such as audio data, video data, and the like. The user device 101 may transmit the entity input 102 to the prompt refinement service 104 directly or indirectly. For example, the user device 101 (i) may be communicatively coupled with the prompt refinement service 104 and may transmit the entity input 102 directly to the prompt refinement service 104, or (ii) may be communicatively coupled with the computing service 202 and may transmit the entity input 102 to the computing service 202, which may input the entity input 102 into the prompt refinement service 104.

The computing service 202 may be or include a cloud computing service that may include, host, or otherwise execute the prompt refinement service 104, the generative model 106, other suitable sub-services, or any combination thereof. For example, the computing service 202 may include a server farm, a set of computing devices, or the like such that at least a subset of the computing service 202 can be accessed via a communication network such as the Internet, a local area network (LAN), etc. The computing service 202 may allow access, for example to the user device 101, to the prompt refinement service 104, to the generative model 106, and the like.

The computing service 202, the prompt refinement service 104, or a combination thereof may receive the entity input 102 from the user device 101. Additionally or alternatively, the prompt refinement service 104 may access the prompt library 116 to identify one or more prompt refiners of the prompt refiners 118 that may enhance the entity input 102 prior to inputting the entity input 102 into the generative model 106. The prompt library 116 may include a first prompt refiner 204a, a second prompt refiner 204b, a third prompt refiner 204c, an nth prompt refiner 204n, etc. The nth prompt refiner 204n may represent an unbounded number (e.g., more than three) of prompt refiners that may be included in the prompt library 116. The prompt refinement service 104 may identify a particular prompt refiner among the prompt refiners included in the prompt library 116 that enhances the entity input 102 more than other prompt refiners included in the prompt library 116. In a particular example, the prompt refinement service 104 may compare each prompt refiner included in the prompt library 116 with each prompt refiner included in a set of input-response pairs on which the prompt refinement service 104 may be trained. The prompt refinement service 104 may determine similarity scores between each prompt refiner included in the prompt library 116 and each prompt refiner, or any subset thereof, included in the input-response pairs. In some examples, the prompt refinement service 104 may identify the particular prompt refiner as the prompt refiner having the highest similarity score.

The prompt refinement service 104 can aggregate the entity input 102 and the particular prompt refiner. For example, the prompt refinement service 104 may augment the particular prompt refiner with the entity input 102 to generate the aggregated input 115. In some examples, aggregating the entity input 102 and the particular prompt refiner may involve extending the string of text of the text input 108 to include the entity input 102 and the particular prompt refiner. In other examples, aggregating the entity input 102 and the particular prompt refiner may involve adding text input that includes the particular prompt refiner to the non-text input 110. The prompt refinement service 104 may transmit the aggregated input 115 to the generative model 106.

The generative model 106 may receive the aggregated input 115 from the prompt refinement service 104. In some examples, the generative model 106 may receive the aggregated input 115 as if the user device 101 directly transmitted the aggregated input 115 to the generative model 106. The generative model 106 may generate the output 122 based at least in part on the aggregated input 115. In a particular example, the aggregated input 115 may indicate that the user of the user device 101 desires to learn about content streaming options. In this example, the generative model 106 may generate the output 122 to include available content streaming options for which the user may qualify. The generative model 106, or the computing service 202, may transmit the output 122 to the user device 101 for displaying the output 122 on the user device 101. In some examples, the user device 101 may display the output 122 as if the generative model 106 generated the output 122 using the entity input 102 (e.g., instead of the aggregated input 115). In other examples, the output 122 may include an indication of the prompt refiner used to enhance the entity input 102 to generate the output 122.

Figure 3:
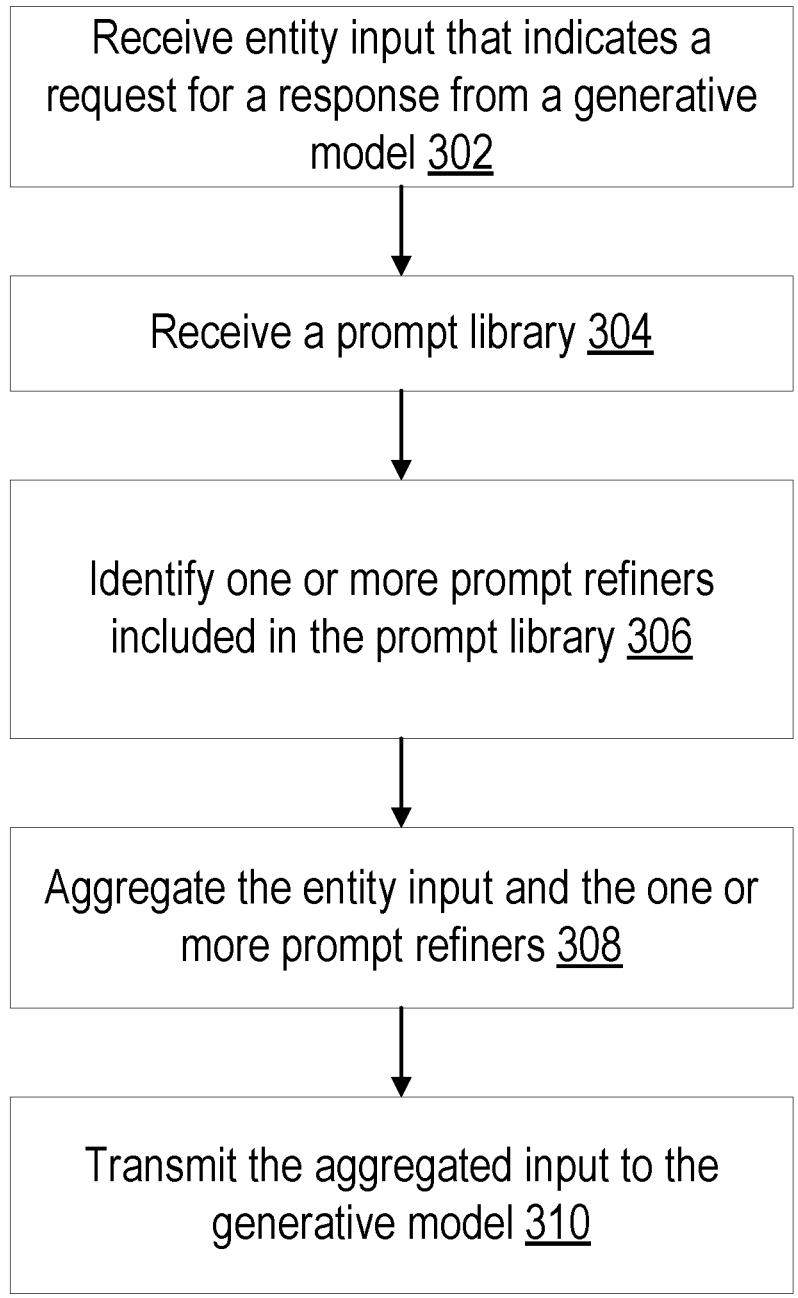
FIG. 3 illustrates a flowchart of a process for refining a prompt for a generative model in accordance with at least one embodiment.

FIG. 3 illustrates a flowchart of a process 300 for refining a prompt for a generative model in accordance with at least one embodiment. Some or all of the process 300 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some examples, the process 300, or any operation thereof, can utilize the prompt refinement service 104 or any other suitable model.

At block 302, the process 300 involves receiving entity input 102 that indicates a request for a response from a generative model 106. The entity input 102 may include text input 108, non-text input 110, or a combination thereof. For example, the entity input 102 may include natural language text, audio data, video data, or any suitable combination thereof. The generative model 106 may include a large language model or any other suitable generative model configured to generate output in response to receiving the entity input 102. In some examples, a user device 101, such as a mobile computing device, a personal computing device (e.g., a laptop, a desktop, etc.), etc., may generate the entity input 102 based at least in part on input provided to the user device 101 by a user of the user device 101. The user may input text, such as via a keyboard, audio data or video data, such as via a camera integrated with or coupled with the user device 101, or any other suitable input into the user device 101. The user device 101 may transmit the entity input 102 to the prompt refinement service 104, to a computing service 202 that may be configured to host or execute the prompt refinement service 104, or the like.

At block 304, the process 300 involves receiving a prompt library 116. The prompt refinement service 104 may access the prompt library 116 to receive the prompt library 116. For example, the prompt library 116 may be stored on or include a data repository that can be communicatively coupled with the prompt refinement service 104. In other examples, the prompt refinement service 104 may make an application programming interface (API) call to the prompt library 116, or the data repository on which the prompt library 116 is stored, to receive the prompt library 116.

The prompt library 116 may be or include a list of prompt refiners that may be used to enhance the entity input 102 prior to or substantially contemporaneous with respect to inputting the entity input 102 into the generative model 106. The prompt library 116, or any set or subset of prompt refiners included therein, may be determined, generated, maintained, and the like by a provider entity, which may be associated with the generative model 106. For example, the provider entity may provide the computing service 202, which can provide access to the prompt refinement service 104, the generative model 106, or a combination thereof, and the provider entity may additionally or alternatively provide the prompt library 116. In other examples, a third-party entity or set of entities may generate, determine, maintain, adjust, and the like the prompt library 116. Additionally or alternatively, the prompt library 116 may include a set of prompt refiners that may include style prompt refiners, tool prompt refiners, rule prompt refiners, and the like. A style prompt refiner may indicate to the generative model 106 a particular style of output requested by the user of the user device 101. A tool prompt refiner may indicate to the generative model 106 a particular tool requested to be used by the user of the user device 101. A rule prompt refiner may indicate to the generative model 106 one or more sets of rules under which the output 122 may be generated.

At block 306, the process 300 involves identifying one or more prompt refiners included in the prompt library 116. The prompt refinement service 104 may identify the one or more prompt refiners as prompt refiners that enhance the entity input 102 more than other prompt refiners included in the prompt library 116. In some examples, the prompt refinement service 104 may determine a similarity score between each prompt refiner included in the prompt library 116 and one or more prompt refiners associated with a set of input-response pairs on which the prompt refinement service 104 may be trained. For example, the prompt refinement service 104 may identify one or more potential entity inputs similar or identical to the entity input 102 and may determine a similarity score between each prompt refiner included in the prompt library 116 and each prompt refiner associated with the one or more potential entity inputs. The prompt refinement service 104 may identify the one or more prompt refiners as prompt refiners that have the highest similarity scores with respect to the one or more prompt refiners among other prompt refiners of the prompt library 116.

At block 308, the process 300 involves aggregating the entity input 102 and the one or more prompt refiners. The prompt refinement service 104 may augment the entity input 102 with the one or more prompt refiners to generate an aggregated input 115. In some examples, the one or more prompt refiners may include a string of text that can be appended to the entity input 102. In other examples, the one or more prompt refiners may include audio data, video data, or the like, and the prompt refinement service 104 can append the entity input 102 with the audio data, video data, or the like.

At block 310, the process 300 involves transmitting the aggregated input 115 to the generative model 106. The prompt refinement service 104 may transmit the aggregated input 115 to, or input the aggregated input 115 into, the generative model 106 to cause the generative model 106 to generate an output 122 based at least in part on the aggregated input 115. The prompt refinement service 104 may input the aggregated input 115 into the generative model 106, may output (e.g., to the computing service 202) the aggregated input 115 to be transmitted to the generative model 106, etc. The prompt refinement service 104 may transmit the entity input 102 and the one or more prompt refiners separately and at separate times, separately and concurrently, or integrated as a single input such as the aggregated input 115. The generative model 106 may receive the aggregated input 115, which may include the entity input 102 and the one or more prompt refiners, and the generative model 106 may generate the output 122. The generative model 106 may transmit the output 122 to the user device 101 for providing the output 122 to the user of the user device 101.

FIG. 4 illustrates a flowchart of a process 400 for training a prompt refinement service 104 in accordance with at least one embodiment. Some or all of the process 400 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some examples, the process 400, or any operation thereof, can utilize the prompt refinement service 104 or any other suitable model.

At block 402, the process 400 involves initializing a prompt refinement service 104 with an initial set of input-response pairs. A computing system, such as the computing service 202, may initialize the prompt refinement service 104. Initializing the prompt refinement service 104 may involve initializing the set of input-response pairs such as by assigning random values or pseudo-random values to each input-response pair of the set of input-response pairs. The set of input-response pairs may be determined based on historical data, by input from a provider entity that provides the prompt refinement service 104, by a third-party entity, or by any other suitable entity or source of data. For example, the set of input-response pairs may be determined based at least in part on historical data that includes previously used entity inputs, previously generated outputs or responses to the entity inputs, previously used prompt refiners, or any combination thereof. In other examples, the set of input-response pairs may be determined by potential entity inputs, or other entity inputs that may be anticipated to be input into the generative model 106 at a subsequent time.

In some examples, the set of input-response pairs can be initialized with random values or pseudo-random values. The random values or the pseudo-random values may range from zero to one such that the random values or the pseudo-random values may be or include weights that indicate a likelihood that the response of the input-response pair will be generated by the generative model 106 using the entity input of the input-response pair as an input into the generative model 106.

At block 404, the process 400 involves receiving a prompt library 116. The prompt refinement service 104 may access the prompt library 116 to receive the prompt refiners 118. For example, the prompt library 116 may be stored on or include a data repository that can be communicatively coupled with the prompt refinement service 104. In other examples, the prompt refinement service 104 may make an application programming interface (API) call to the prompt library 116, or the data repository on which the prompt library 116 is stored, to receive the prompt library 116 or any contents thereof such as the prompt refiners 118.

The prompt library 116 may be or include a list of prompt refiners that may be used to enhance the entity input 102 prior to or substantially contemporaneous with respect to inputting the entity input 102 into the generative model 106. The prompt library 116, or any set or subset of prompt refiners included therein, may be determined, generated, maintained, and the like by a provider entity, which may be associated with the generative model 106. For example, the provider entity may provide the computing service 202, which can provide access to the prompt refinement service 104, the generative model 106, or a combination thereof, and the provider entity may additionally or alternatively provide the prompt library 116. In other examples, a third-party entity or set of entities may generate, determine, maintain, adjust, and the like the prompt library 116. Additionally or alternatively, the prompt library 116 may include a set of prompt refiners that may include style prompt refiners, tool prompt refiners, rule prompt refiners, and the like. A style prompt refiner may indicate to the generative model 106 a particular style of output requested by the user of the user device 101. A tool prompt refiner may indicate to the generative model 106 a particular tool requested to be used by the user of the user device 101. A rule prompt refiner may indicate to the generative model 106 one or more sets of rules under which the output 122 may be generated.

At block 406, the process 400 involves training the prompt refinement service 104 in an offline mode or an offline configuration using the prompt library 116. Training the prompt refinement service 104 may involve adjusting values associated with each input-response pair of the set of input-response pairs. In a particular example, the prompt refinement service 104 may be trained, for example by the computing service 202, by adjusting values associated with each input-response pair or by verifying that one or more initialized values of the set of input-response pairs is accurate. The values associated with each input-response pair may include a weight, for example ranging from zero to one (though other values less than zero or greater than one are possible), that indicates a likelihood that the corresponding response may be generated by the generative model 106 in response to inputting the corresponding input into the generative model 106. In a particular example, a value of zero may indicate that the input is not at all likely to cause the generative model 106 to generate the corresponding response in response to inputting the corresponding input into the generative model 106, while a value of one may indicate that the input is at least nearly 100% likely to cause the generative model 106 to generate the corresponding response in response to inputting the corresponding input into the generative model 106. Additionally or alternatively, the respective inputs of the input-response pairs may include or be aggregated with one or more prompt refiners such as the prompt refiners included in the prompt library 116. Training the prompt refinement service 104 may involve further adjusting the values for the input-response pairs based at least in part on the aggregated inputs and prompt refiners.

At block 408, the process 400 involves receiving input from an entity such that the input characterizes one or more prompt refiners of the set of prompt refiners included in the prompt library 116. The prompt refinement service 104 may receive entity input 102, for example, from a user device 101, and the prompt refinement service 104 may aggregate the entity input 102 and one or more prompt refiners identified by the prompt refinement service 104 to generate an aggregated input 115. The prompt refinement service 104 can transmit the aggregated input 115 to a generative model 106, which may generate an output 122 based at least in part on the aggregated input 115. The generative model 106, or any computing service on which the generative model 106 may be hosted, may transmit the output 122 to the user device 101 to provide the output 122 to a user of the user device 101.

In response to viewing or otherwise receiving the output 122, the user may indicate whether the output 122 is satisfactory. For example, the user device 101 may receive input from the user characterizing the output 122 as satisfactory or unsatisfactory. In some examples, the input may be active or direct such as an answer to a survey question, a positively toned or negatively toned feedback instance, and the like. Additionally or alternatively, the input may be passive or indirect such as one or more actions, or lack thereof, subsequent to being provided the output 122. In a particular example, the user may indicate that the output 122 is satisfactory by answering a survey or feedback question positively, by using at least a subset of the output 122 in a subsequent interaction, and the like. In another example, the user may indicate that the output 122 is unsatisfactory by answering a survey or feedback question negatively, by not using at least a subset of the output 122 in a subsequent interaction, by resubmitting a similar or identical input for the generative model 106, and the like. The input may at least indirectly characterize a performance of the one or more prompt refiners.

At block 410, the process 400 involves adjusting the set of input-response pairs based at least in part on the input received from the entity. The prompt refinement service 104, or any computing service on which the prompt refinement service 104 may be hosted, may determine whether the input received from the entity is positive or negative. Positive input may indicate that the one or more prompt refiners may be satisfactory, and negative input may indicate that the one or more prompt refiners may not be satisfactory. In response to determining that the input received from the entity is positive, the respective input-response pair of the set of input-response pairs may not be adjusted or may be adjusted to increase the value of the respective input-response pair. In response to determining that the input received from the entity is negative, the respective input-response pair of the set of input-response pairs may be adjusted to decrease the value of the respective input-response pair or may be adjusted to avoid using the prompt refiner of the respective input-response pair.

Figure 5:
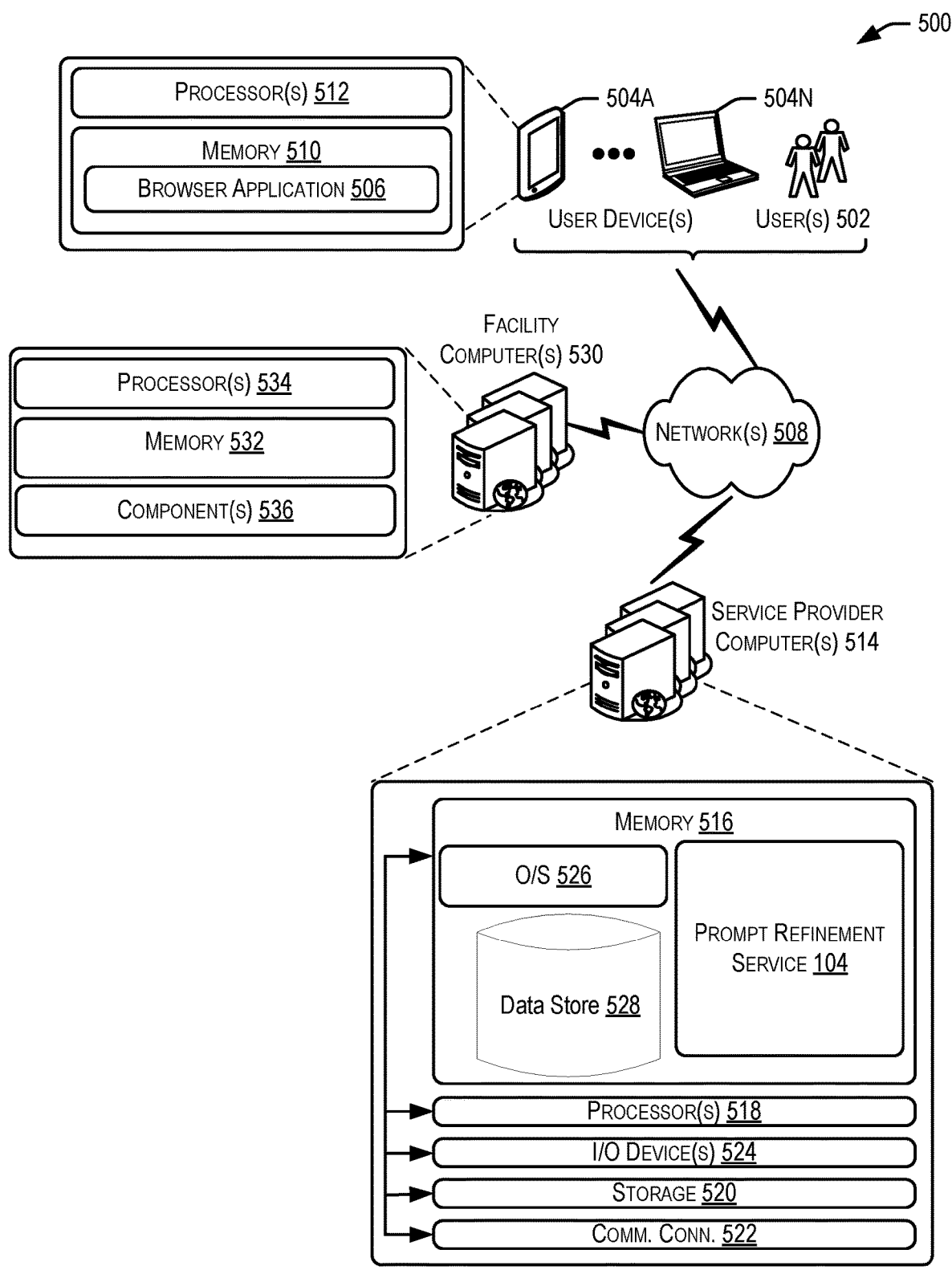
FIG. 5 illustrates an example architecture for a prompt refinement service that includes one or more service provider computers, a user device, and one or more facility computers in accordance with at least one embodiment.

FIG. 5 illustrates an example of an architecture 500 for a prompt refinement service, such as the prompt refinement service 104, that includes one or more service provider computers, a user device, and one or more facility computers in accordance with at least one embodiment. In the architecture 500, one or more users 502, such as video editors and/or entities associated with computer systems implementing the camera position service 250, may utilize user computing devices 504A-N(collectively, user devices 504) to access a browser application 506 or a user interface (UI) that can be accessed through the browser application 506 and via one or more networks 508, to receive text data, image data, video data, or the like, which may be presented and interacted with via browser application 506 or the UI accessible through the browser application 506. The "browser application" 506 can be or include any browser control or native application that can access and/or display a network page or other information. A native application may include an application or program that has been developed for use on a particular platform, such as an operating system, or a particular device such as a particular type of mobile device.

In accordance with at least one embodiment, the user devices 504 may be configured for communicating with service provider computers 514 and facility computers 530 via networks 508. The user devices 504 may include at least one memory, such as memory 510, and one or more processing units or one or more processors 512. The memory 510 may store program instructions that are loadable and executable on the one or more processors 512, as well as data generated during the execution of these programs. Depending on the configuration and type of the user devices 504, the memory 510 may be volatile, such as random access memory (RAM), and/or non-volatile such as read-only memory (ROM), flash memory, etc. The user devices 504 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program services, and other data for the user devices 504. In some implementations, the memory 510 may include multiple different types of memory, such as static random access memory (SRAM), dynamic random access memory (DRAM), ROM, etc.

Turning to the contents of the memory 510 in more detail, the memory 510 may include an operating system and one or more application programs or services for implementing the features disclosed herein. Additionally or alternatively, the memory 510 may include one or more services for implementing the features described herein such as the prompt refinement service 104.

The architecture 500 may additionally include one or more service provider computers 514 that may, in some examples, provide computing resources such as, but not limited to, client entities, low latency data storage, durable data storage, data access, management, virtualization, hosted computing environment or "cloud-based" solutions, prompt refinement or engineering feature implementation, etc. The service provider computers 514 may implement or be an example of one or more machine-learning models or one or more service provider computers (e.g., the computing devices) described herein with reference to FIGS. 1-4 and/or throughout the disclosure. The one or more service provider computers 514 may also be operable to provide site hosting, computer application development, and/or implementation platforms, combinations of the foregoing, or the like to the one or more users 502 via user devices 504.

In some examples, the networks 508 may include any one or a combination of many different types of networks, such as cable networks, the Internet, wireless networks, cellular networks, and other private and/or public networks. While the illustrated examples represent the users 502 communicating with the service provider computers 514 over the networks 508, the described techniques may equally apply in instances where the users 502 interact with the one or more service provider computers 514 via the one or more user devices 504 over a landline phone, via a kiosk, or in any other manner. It is also noted that the described techniques may apply in other client/server arrangements, such as set-top boxes, etc., as well as in non-client/server arrangements such as locally stored applications, peer-to-peer arrangements, etc. In embodiments, the users 502 may communicate with the facility computers 530 via networks 508, and the facility computers 530 may communicate with the service provider computers 514 via networks 508. In some embodiments, the service provider computers 514 may communicate, via networks 508, with one or more third party computers (not illustrated) to obtain data inputs for the various algorithms of the generation features described herein. In accordance with at least one embodiment, the service provider computers 514 may receive text data, video data, image data, one or more prompts, aggregated inputs generated from the foregoing, or the like for at least refining a prompt for a generative model.

The one or more service provider computers 514 may be or include any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the one or more service provider computers 514 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment or a distributed computing environment. In some examples, the one or more service provider computers 514 may be in communication with the user device 504 via the networks 508, or via other network connections. The one or more service provider computers 514 may include one or more servers, which may be arranged in a cluster or as individual servers not associated with one another. In embodiments, the service provider computers 514 may be in communication with one or more third party computers (not illustrated) via networks 508 to receive or to otherwise obtain data including text data, video data, image data, one or more prompts, aggregated inputs generated from the foregoing, or the like for at least refining a prompt for a generative model.

In one illustrative configuration, the one or more service provider computers 514 may include at least one memory, such as memory 516, and one or more processing units or one or more processors 518. The one or more processors 518 may be implemented as appropriate in hardware, computer-executable instructions, firmware, or any combination thereof. Computer-executable instruction or firmware implementations of the one or more processors 518 may include computer-executable or machine-executable instructions written in any suitable programming language to perform the various functions described when executed by a hardware computing device such as a processor. The memory 516 may store program instructions that are loadable and executable on the one or more processors 518, as well as data generated during the execution of these programs. Depending on the configuration and type of the one or more service provider computers 514, the memory 516 may be volatile, such as RAM, and/or non-volatile such as ROM, flash memory, etc. The one or more service provider computers 514 or servers may also include additional storage 520, which may include removable storage and/or non-removable storage. The additional storage 520 may include, but is not limited to, magnetic storage, optical disks and/or tape storage. The disk drives and their associated computer-readable media may provide non-volatile storage of computer-readable instructions, data structures, program services, and other data for the computing devices. In some implementations, the memory 516 may include multiple different types of memory, such as SRAM, DRAM, ROM, etc.

The memory 516, the additional storage 520, removable and/or non-removable, are examples of non-transitory computer-readable storage media. For example, computer-readable storage media may include volatile or non-volatile, removable or non-removable media implemented in any method or technology for storage of information such as computer-readable instructions, data structures, program services, or other data. The memory 516 and the additional storage 520 are examples of non-transitory computer storage media. Additional types of non-transitory computer storage media that may be present in the one or more service provider computers 514 may include, but are not limited to, PRAM, SRAM, DRAM, RAM, ROM, EEPROM, flash memory or other memory technology, CD-ROM, DVD, or other optical storage, magnetic cassettes, magnetic tape, magnetic disk storage or other magnetic storage devices, or any other medium which can be used to store the desired information and which can be accessed by the one or more service provider computers 514. Combinations of any of the above should also be included within the scope of non-transitory computer-readable media.

The one or more service provider computers 514 may also include one or more communication connection interfaces 522 that can allow the one or more service provider computers 514 to communicate with a data store, another computing device or server, user terminals, and/or other devices on the networks 508. The one or more service provider computers 514 may also include one or more I/O devices 524, such as a keyboard, a mouse, a pen, a voice input device, a touch input device, a display, speakers, a printer, etc.

Turning to the contents of the memory 516 in more detail, the memory 516 may include an operating system 526, one or more data stores 528, and/or one or more application programs or services for implementing the features disclosed herein including the prompt refinement service 104. The architecture 500 includes facility computers 530. In embodiments, the service provider computers 514 and the prompt refinement service 104 may be configured to generate and transmit instructions, via networks 508, to components 536 in communication or otherwise associated with facility computers 530. For example, the instructions may be configured to activate or otherwise trigger the components 536 for transmitting an aggregated prompt determined by the prompt refinement service 104. The facility computers 530 may include at least one memory, such as memory 532, and one or more processing units or one or more processors 534. The memory 532 may store program instructions, which may include one or more machine-learning models as disclosed herein, that can be loaded and executed on the one or more processors 534, as well as data generated during the execution of these programs. Depending on the configuration and type of the facility computers 530, the memory 532 may be volatile, such as random access memory (RAM), and/or non-volatile such as read-only memory (ROM), flash memory, etc. The facility computers 530 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program services, and other data for the facility computers 530. In some implementations, the memory 532 may include multiple different types of memory, such as static random access memory (SRAM), dynamic random access memory (DRAM), ROM, etc.

Turning to the contents of the memory 532 in more detail, the memory 532 may include an operating system and one or more application programs or services for implementing the features disclosed herein. Additionally, the memory 532 may include one or more services for implementing the features described herein, which may include the prompt refinement service 104. In some embodiments, the service provider computers 514 and the prompt refinement service 104 may determine an aggregated prompt for input into a generative model based at least in part on entity input and a prompt refiner selected by the prompt refinement service 104. The user device 504 and the browser application 506 may be configured to transmit the output to the user 502. In accordance with at least one embodiment, the prompt refinement service 104 may be configured to receive entity input, a prompt library, and the like. In some embodiments, some, a portion, or all of these input data may be stored and transmitted as text files or other files, which may include text data. In some embodiments, the prompt refinement service 104 may be configured to implement one or more machine-learning models, computer models, computer algorithms, etc., to select a particular prompt refiner, aggregate the entity input and the particular prompt refiner, transmit the aggregated input to the generative model, and the like.

The prompt refinement service 104 may be configured to generate and transmit a user interface or data objects for updating a user interface presented via browser application 506 and user device 504 for presenting the aggregated prompt, the output from the generative model, or any components thereof or associated therewith to the user 502. Other graphical updates, feedback mechanisms, and data object generation associated with the prompt refinement features described herein may be implemented by the service provider computers 514 and/or the prompt refinement service 104.

Figure 6:
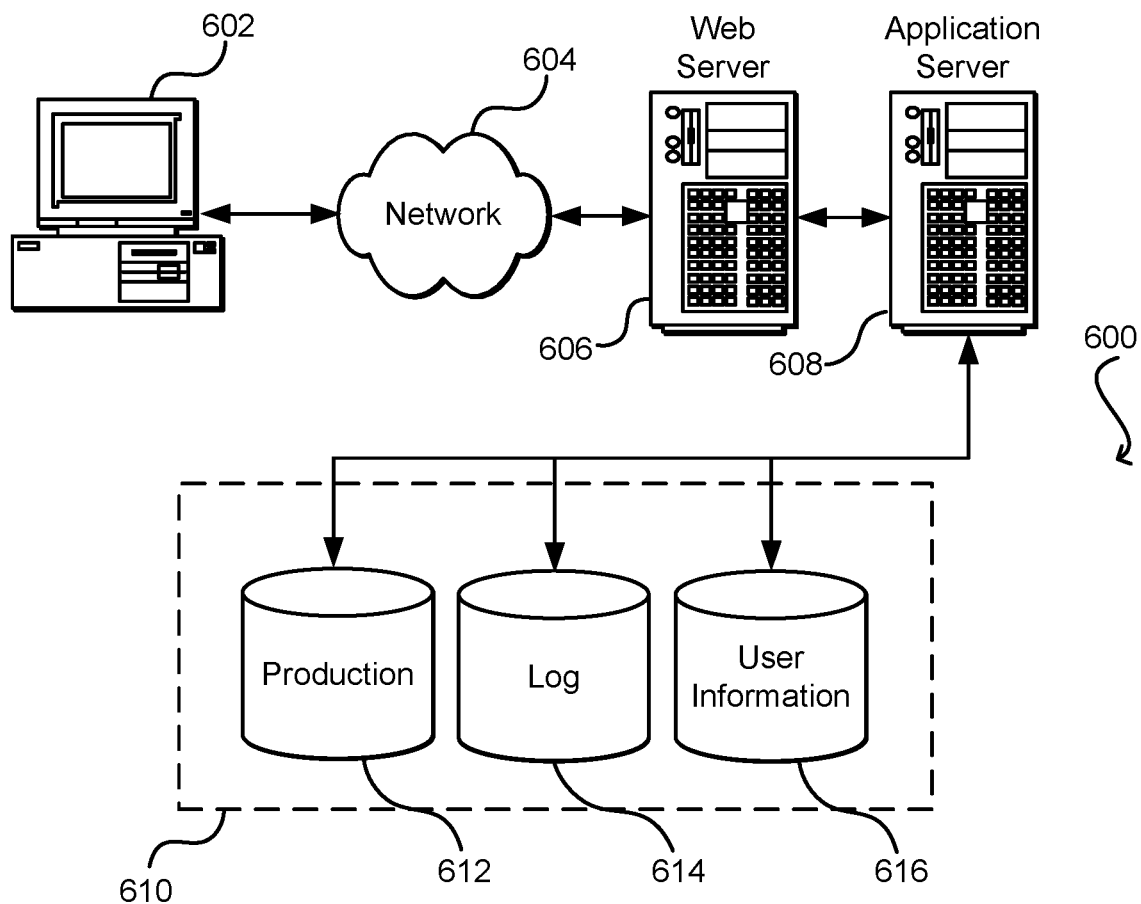
FIG. 6 illustrates an example of an environment in which various embodiments can be implemented.

FIG. 6 illustrates aspects of an example of an environment 600 for implementing aspects in accordance with various embodiments. As will be appreciated, although a Web-based environment is used for purposes of explanation, different environments may be used, as appropriate, to implement various embodiments. The environment includes an electronic client device 602, which can include any appropriate device operable to send and receive requests, messages, or information over an appropriate network 604 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 606 for receiving requests and serving content in response thereto, although for other networks an alternative device serving a similar purpose could be used as would be apparent to one of ordinary skill in the art.

The illustrative environment includes at least one application server 608 and a data store 610. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 602 and the application server 608, can be handled by the Web server. It should be understood that the Web and application servers are not required and are merely example components, as structured code discussed herein can be executed on any appropriate device or host machine as discussed elsewhere herein.

The data store 610 can include several separate data tables, databases or other data storage mechanisms and media for storing data relating to a particular aspect. For example, the data store illustrated includes mechanisms for storing production data 612 and user information 616, which can be used to serve content for the production side. The data store also is shown to include a mechanism for storing log data 614, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 610. The data store 610 is operable, through logic associated therewith, to receive instructions from the application server 608 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in results listing on a Web page that the user is able to view via a browser on the user device 602. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 6. Thus, the depiction of the environment 600 in FIG. 6 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    receiving, by a computing system, a set of prompt refiners, each prompt refiner of the set of prompt refiners configured to enhance a performance of a generative model when aggregated with input from an entity;
    training a prompt refinement service by determining a particular prompt refiner of the set of prompt refiners, wherein the particular prompt refiner of the set of prompt refiners has a highest similarity score with respect to a potential entity input compared with other similarity scores of other prompt refiners of the set of prompt refiners;
    receiving, by the prompt refinement service of the computing system, entity input that indicates a request for a response from the generative model;
    identifying, by the prompt refinement service and among the set of prompt refiners, one or more prompt refiners having a highest similarity to the entity input compared with other prompt refiners of the set of prompt refiners;
    aggregating, by the prompt refinement service, the one or more prompt refiners with the entity input to generate an aggregated input; and
    transmitting, by the prompt refinement service, the aggregated input to the generative model to cause the generative model to return an output in response to the entity input.

2. The computer-implemented method of claim 1, wherein training the prompt refinement service comprises:
    receiving subsequent input from the entity, the subsequent input indicating that the output from the generative model is unsatisfactory; and
    further adjusting a plurality of input-response pairs based at least in part on the subsequent input from the entity.

3. The computer-implemented method of claim 1, further comprising:
    initializing, by the computing system, the prompt refinement service by assigning values to a plurality of input-response pairs;
    training, by the computing system, the prompt refinement service by determining, for each potential entity input of a plurality of potential entity inputs, a corresponding prompt refiner of the set of prompt refiners; and
    adjusting, by the computing system, the plurality of input-response pairs based at least in part on the corresponding prompt refiner of the set of prompt refiners to associate the potential entity input and the corresponding prompt refiner with the plurality of input-response pairs.

4. The computer-implemented method of claim 3, wherein the corresponding prompt refiner of the set of prompt refiners has a highest similarity score with respect to the potential entity input of the plurality of potential entity inputs compared with other similarity scores of other prompt refiners of the set of prompt refiners.

5. A non-transitory computer-readable medium comprising instructions stored thereon that, when executed by a processing device of a prompt refinement service, configure the processing device to perform operations comprising:
    training the prompt refinement service by determining a first particular prompt refiner of a set of prompt refiners, wherein the first particular prompt refiner of the set of prompt refiners has a highest similarity score with respect to a potential entity input compared with other similarity scores of other prompt refiners of the set of prompt refiners;
    receiving, by the prompt refinement service, entity input that indicates a request for a response from a generative model;
    receiving, by the prompt refinement service, the set of prompt refiners;
    identifying, by the prompt refinement service, among the set of prompt refiners, a second particular prompt refiner having a highest similarity to the entity input compared with other prompt refiners of the set of prompt refiners;
    aggregating, by the prompt refinement service, the second particular prompt refiner with the entity input to generate an aggregated input; and
    transmitting, by the prompt refinement service, the aggregated input to the generative model to cause the generative model to return an output in response to the entity input.

6. The non-transitory computer-readable medium of claim 5, wherein each prompt refiner of the set of prompt refiners is configured to enhance a performance of the generative model when aggregated with input from an entity.

7. The non-transitory computer-readable medium of claim 6, wherein the set of prompt refiners is determined by a provider entity associated with the generative model, and wherein the set of prompt refiners includes style prompt refiners, tool prompt refiners, or rule prompt refiners.

8. The non-transitory computer-readable medium of claim 5, wherein the operations further comprise:
    initializing the prompt refinement service by randomly assigning values to a plurality of input-response pairs.

9. The non-transitory computer-readable medium of claim 8, wherein the operations further comprise adjusting the plurality of input-response pairs based at least in part on a corresponding prompt refiner of the set of prompt refiners such that the potential entity input and the corresponding prompt refiner are associated in the plurality of input-response pairs.

10. The non-transitory computer-readable medium of claim 9, wherein the operations further comprise:
    receiving subsequent input from an entity, the subsequent input indicating that the output from the generative model is not satisfactory; and
    further adjusting the plurality of input-response pairs based at least in part on the subsequent input from the entity.

11. The non-transitory computer-readable medium of claim 10, wherein the operations further comprise:
    generating a prompt rating for the second particular prompt refiner based at least in part on the subsequent input from the entity; and storing the prompt rating and the second particular prompt refiner in a prompt library such that the second particular prompt refiner is associated with the prompt rating.

12. The non-transitory computer-readable medium of claim 10, wherein the operations further comprise:

generating a decision tree using at least a portion of the set of prompt refiners, wherein the decision tree comprises two or more levels of a hierarchy, and wherein each level of the two or more levels of the hierarchy comprises at least one prompt refiner of the set of prompts refiners; and traversing the decision tree by (i) selecting a first prompt refiner from a first subset of prompt refiners included in a first level of the hierarchy and (ii) selecting a second prompt refiner from a second subset of prompt refiners included in a second level of the hierarchy.

13. The non-transitory computer-readable medium of claim 5, wherein the generative model comprises a large language model configured to output a text response to the aggregated input.

14. A computer system, comprising:

a memory configured to store computer-executable instructions; and a processor in communication with the memory configured to execute the computer-executable instructions to perform operations comprising:

training a prompt refinement service by determining a first particular prompt refiner of a set of prompt refiners, wherein the first particular prompt refiner of the set of prompt refiners has a highest similarity score with respect to a potential entity input compared with other similarity scores of other prompt refiners of the set of prompt refiners;

receiving, by the prompt refinement service, entity input that indicates a request for a response from a generative model;

receiving, by the prompt refinement service, the set of prompt refiners;

identifying, by the prompt refinement service, among the set of prompt refiners, a second particular prompt refiner having a highest similarity to the entity input compared with other prompt refiners of the set of prompt refiners;

aggregating, by the prompt refinement service, the second particular prompt refiner with the entity input to generate an aggregated input; and transmitting, by the prompt refinement service, the aggregated input to the generative model to cause the generative model to return an output in response to the entity input.

15. The computer system of claim 14, wherein the generative model is (i) a large language model configured to output a text response or a visual response to the aggregated input.

16. The computer system of claim 14, wherein the operations further comprise:

initializing the prompt refinement service by randomly assigning values to a plurality of input-response pairs; and adjusting the plurality of input-response pairs based at least in part on a corresponding prompt refiner of the set of prompt refiners such that the potential entity input and the corresponding prompt refiner are associated in the plurality of input-response pairs.

17. The computer system of claim 16, wherein the operations further comprise:

receiving subsequent input from an entity, the subsequent input indicating that the output from the generative model is not satisfactory; and further adjusting the plurality of input-response pairs or input, temperature tuple-response pairs based at least in part on the subsequent input from the entity.

18. The computer system of claim 17, wherein the operations further comprise:

generating a prompt rating for the second particular prompt refiner based at least in part on the subsequent input from the entity; and storing the prompt rating and the second particular prompt refiner in a prompt library such that the second particular prompt refiner is associated with the prompt rating.

19. The computer system of claim 17, wherein the operations further comprise:

generating a decision tree using at least a portion of the set of prompt refiners, wherein the decision tree comprises two or more levels of a hierarchy, and wherein each level of the two or more levels of the hierarchy comprises at least one prompt refiner of the set of prompts refiners; and traversing the decision tree by (i) selecting a first prompt refiner from a first subset of prompt refiners included in a first level of the hierarchy and (ii) selecting a second prompt refiner from a second subset of prompt refiners included in a second level of the hierarchy.

20. The computer system of claim 14, wherein each prompt refiner of the set of prompt refiners is configured to enhance a performance of the generative model when aggregated with input from an entity, and wherein the set of prompt refiners is determined by a provider entity associated with the generative model, and wherein the set of prompt refiners includes style prompt refiners, tool prompt refiners, or rule prompt refiners.

* * * * *